United States Patent
Okada (10) Patent No.: US 9,096,464 B2
(45) Date of Patent: Aug. 4, 2015

(54) METHOD AND APPARATUS FOR MANUFACTURING OPTICAL FIBER

(71) Applicant: FUJIKURA LTD., Koto-ku, Tokyo (JP)

(72) Inventor: Kenji Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 175 days.

(21) Appl. No.: 13/706,587

(22) Filed: Dec. 6, 2012

(65) Prior Publication Data

US 2013/0118208 A1 May 16, 2013

Related U.S. Application Data

(63) Continuation of application No. PCT/JP2011/063273, filed on Jun. 9, 2011.

(30) Foreign Application Priority Data

Jun. 11, 2010 (JP) .................... 2010-134387

(51) Int. Cl.
C03C 25/10 (2006.01)
C03B 37/025 (2006.01)
C03B 37/027 (2006.01)
C03B 37/03 (2006.01)

(52) U.S. Cl.
CPC ....... *C03C 25/1065* (2013.01); *C03B 37/02718* (2013.01); *C03B 37/032* (2013.01); *C03C 25/105* (2013.01); *C03B 2205/06* (2013.01)

(58) Field of Classification Search
CPC ............ C03B 37/025; C03B 37/02745; C03B 37/032
See application file for complete search history.

(56) References Cited

U.S. PATENT DOCUMENTS

| | | | | |
|---|---|---|---|---|
| 5,203,896 A * | 4/1993 | Neuberger | ...................... | 65/425 |
| 5,416,880 A * | 5/1995 | Edwards et al. | .............. | 385/128 |
| 5,647,884 A * | 7/1997 | Overton et al. | ................. | 65/533 |
| 5,756,165 A * | 5/1998 | Ali et al. | ........................ | 427/513 |
| 2002/0112508 A1* | 8/2002 | Ohba et al. | ...................... | 65/425 |
| 2003/0051511 A1 | 3/2003 | Suzuki et al. | | |
| 2003/0126890 A1* | 7/2003 | Orita et al. | ...................... | 65/432 |
| 2009/0205374 A1* | 8/2009 | Pata et al. | ........................ | 65/402 |

FOREIGN PATENT DOCUMENTS

| | | |
|---|---|---|
| CN | 1177111 A | 3/1998 |
| CN | 1684916 A | 10/2005 |
| JP | 61-017444 A | 1/1986 |

(Continued)

OTHER PUBLICATIONS

English Translation of JP61-017444, performed by Phoenix Translations, Aug. 2014.*

(Continued)

*Primary Examiner* — Lisa Herring
(74) *Attorney, Agent, or Firm* — Sughrue Mion, PLLC (57) ABSTRACT

This optical fiber manufacturing method includes: forming a bare optical fiber by drawing an optical fiber preform; forming an intermediate optical fiber by providing a coating layer, which is formed of resin, on the outer periphery of the bare optical fiber; performing primary curing of the coating layer which forms the intermediate optical fiber; pressing the outer periphery of the intermediate optical fiber; and performing secondary curing of the pressed coating layer of the intermediate optical fiber.

5 Claims, 7 Drawing Sheets

(56) References Cited

FOREIGN PATENT DOCUMENTS

| | | |
|---|---|---|
| JP | 9-227171 A | 9/1997 |
| JP | 2002-12454 A | 1/2002 |
| JP | 2005-343703 A | 12/2005 |
| JP | 2008-214134 A | 9/2008 |
| JP | 4194976 B2 | 12/2008 |

OTHER PUBLICATIONS

Office Action issued by Chinese Patent Office in Chinese Application No. 201180005208.7 mailed Jan. 30, 2014.
International Search Report for PCT/JP2011/063273 dated Sep. 13, 2011.

* cited by examiner

APPARATUS D

METHOD AND APPARATUS FOR MANUFACTURING OPTICAL FIBER

CROSS REFERENCE TO RELATED APPLICATIONS

This application is a continuation application based on a PCT Patent Application No. PCT/JP2011/063273, filed Jun. 9, 2011, whose priority is claimed on Japanese Patent Application No. 2010-134387, filed Jun. 11, 2010, the entire content of which are hereby incorporated by reference.

BACKGROUND OF THE INVENTION

1. Field of the Invention

The present invention relates to a method and apparatus for manufacturing an optical fiber.

2. Description of the Related Art

In general, an optical fiber is manufactured as follows.

Figure 7:
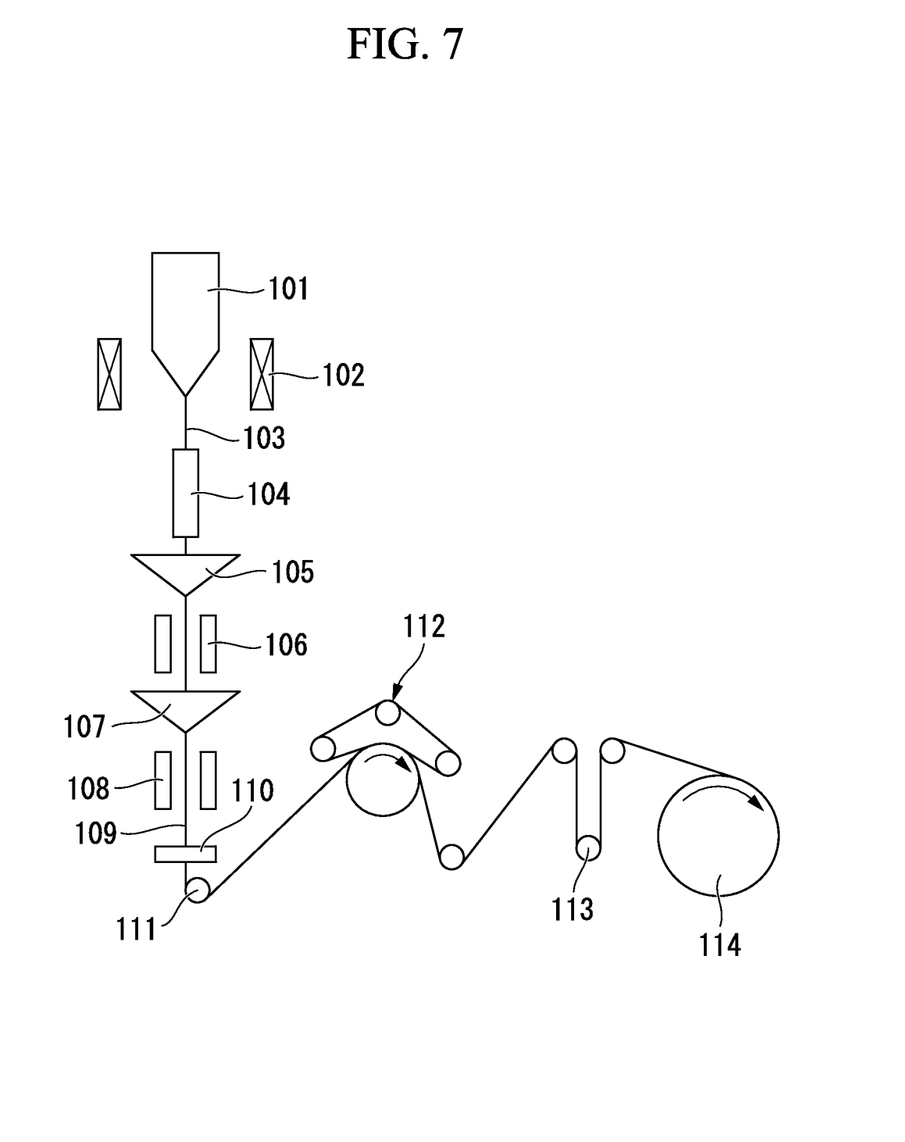
FIG. 7 is a schematic view showing the schematic configuration of a conventional optical fiber manufacturing apparatus.

FIG. 7 is a schematic view showing the schematic configuration of an optical fiber manufacturing apparatus used in a conventional optical fiber manufacturing method.

In the manufacture of an optical fiber, first, an optical fiber preform 101 having silica-based glass as a main component is placed in a drawing furnace 102, the distal end of the optical fiber preform 101 is heated to high temperature of 2000° C. in an inert gas atmosphere of argon (Ar), helium (He), and the like, and it is drawn to form a bare optical fiber 103.

Then, the bare optical fiber 103 is fed into a cooling tube 104.

Cooling gas, such as helium or nitrogen gas, is supplied to the cooling tube 104. In the cooling tube 104, the bare optical fiber 103 is quenched to a temperature suitable for forming a primary coating layer in the next step.

Then, the bare optical fiber 103 cooled by the cooling tube 104 is coated with a primary coating layer, which is formed of ultraviolet curable resin or the like, by a coating material application device 105 and a UV lamp 106 for forming the primary coating layer.

In addition, the bare optical fiber 103 on which the primary coating layer is provided is coated with a secondary coating layer, which is formed of ultraviolet curable resin or the like, by a coating material application device 107 and a UV lamp 108 for forming the secondary coating layer. As a result, an optical fiber 109 is formed.

In addition, the optical fiber 109 being drawn is spun using a spinning device 110. The direction of the optical fiber 109 is changed to a different direction by a turn pulley 111, and the optical fiber 109 is wound on a winding drum 114 through a drawing capstan 112 and a dancer roll 113.

In recent years, in order to reduce polarization mode dispersion (hereinafter, abbreviated as "PMD") of an optical fiber in the manufacture of an optical fiber, the spinning device 110 for spinning the optical fiber 109 is provided in the optical fiber manufacturing apparatus described above, so that the bare optical fiber 103 is drawn while spinning a heated and melted portion of the optical fiber preform 101 (lower end of the optical fiber preform 101).

The spin applied to the optical fiber 109, which is being drawn, using the spinning device 110 is transmitted to the heated and melted portion of the optical fiber preform 101.

For this reason, the bare optical fiber 103 is drawn while the heated and melted portion of the optical fiber preform 101 is being spun.

Accordingly, the spin is fixed to the bare optical fiber 103 after the drawing.

Conventionally, when spinning an optical fiber using a spinning device, a spin torque is applied by pressing the optical fiber bidirectionally with a pair of spinning rollers, for example.

In such a spinning device, spinning is performed while controlling the distance between the spinning rollers in order to reduce damage to the coating layer of the optical fiber, and therefore deformation of the coating layer, peeling of the interface between the primary coating layer and glass, and cracking of the primary coating layer that occurs when there is a lot of damage are prevented (for example, refer to Japanese Patent No. 4194976).

In addition, when drawing an optical fiber with a drawing capstan, a drawing capstan which grips an optical fiber with a capstan wheel and a capstan belt is generally used (for example, refer to Japanese Unexamined Patent Application, First Publication No. H9-227171).

This prevents slippage of the capstan and the optical fiber.

However, in some gripping conditions, the coating layer is damaged, and therefore deformation of the coating layer, peeling of the interface between the primary coating layer and glass, and cracking of the primary coating layer occur.

For this reason, gripping pressure, tensile strength, surface roughness, and a step difference are adjusted to the optimal range in order to reduce damage to the optical fiber coating layer.

Moreover, according to a recent increase in the drawing speed of an optical fiber, improvements in the characteristics of a UV resin material itself (such as improvements in the curing rate) or improvements in optical fiber drawing technology have been made.

However, when increasing the speed by remodeling the conventional device, it is necessary to efficiently dispose a cooling zone, a coating zone, a UV curing zone, a spinning device zone, a drawing capstan zone, and the like in a limited space due to the height restrictions of drawing equipment.

For this reason, a case where the spinning device zone should be set immediately below the UV curing zone or a case where the distance between the UV curing zone and the drawing capstan cannot be sufficiently secured occurs.

As a result, the temperature of the coating layer of the optical fiber at the installation position of the spinning device or the position of the drawing capstan becomes high.

Accordingly, the Young's modulus of the coating layer is reduced, and deformation of the coating layer occurs more easily than before.

As a result, deformation of the optical fiber coat increases even in the range of pressure of a conventional spinning device or pressing force of a drawing capstan belt. Depending on the case, this causes a problem of peeling of the interface between the primary coating layer and glass or cracking of the primary coating layer.

Moreover, in order to introduce a cooler to lower the temperature of the coating layer, it is necessary to secure a new space.

As a result, the balance of the required lengths of various devices (a cooler, a coating device, a UV curing device, and the like) is broken due to height restriction of drawing equipment, making it impossible to increase the drawing speed.

The present invention has been devised in view of such a conventional situation, and it is a first object of the present invention to provide an optical fiber manufacturing method capable of efficiently manufacturing an optical fiber with a high level of reliability by preventing deformation or peeling of a coating layer without reducing the drawing speed.

In addition, it is a second object of the present invention to provide an optical fiber manufacturing apparatus capable of manufacturing an optical fiber with a high level of reliability efficiently by preventing deformation or peeling of a coating layer without complicating the apparatus or reducing the drawing speed.

SUMMARY

An optical fiber manufacturing method according to a first aspect of the present invention includes: forming a bare optical fiber by drawing an optical fiber preform (step A); forming an intermediate optical fiber by providing a coating layer, which is formed of resin, on an outer periphery of the bare optical fiber (step B); performing primary curing of the coating layer which forms the intermediate optical fiber (step C); pressing an outer periphery of the intermediate optical fiber (step D); and performing secondary curing of the pressed coating layer of the intermediate optical fiber (step E).

In the optical fiber manufacturing method related to the first aspect of the present invention, when pressing the outer periphery of the intermediate optical fiber (step D), the intermediate optical fiber may be spun by making at least a pair of spinning rollers perform translational movement or rocking movement in a state where the pair of spinning rollers are in contact with part of the outer periphery of the intermediate optical fiber through the primary-cured coating layer.

In the optical fiber manufacturing method related to the first aspect of the present invention, when pressing the outer periphery of the intermediate optical fiber (step D), the intermediate optical fiber may be gripped and drawn using a capstan wheel and a capstan belt.

In the optical fiber manufacturing method related to the first aspect of the present invention, when pressing the outer periphery of the intermediate optical fiber (step D), the intermediate optical fiber may be spun by making at least a pair of spinning rollers perform translational movement or rocking movement in a state where the pair of spinning rollers are in contact with part of the outer periphery of the intermediate optical fiber through the primary-cured coating layer, and the intermediate optical fiber may be gripped and drawn using a capstan wheel and a capstan belt.

In the optical fiber manufacturing method related to the first aspect of the present invention, a configuration may be adopted in which the coating layer when forming the intermediate optical fiber (step B) includes a first layer disposed in contact with the bare optical fiber and a second layer disposed so as to overlap the first layer and a Young's modulus of resin which forms the second layer is higher than a Young's modulus of resin which forms the first layer.

In the optical fiber manufacturing method related to the first aspect of the present invention, when the coating layer is formed in a two-layer structure having the first and second layers, the coating layer may be primary-cured after the first layer is formed and also primary-cured after the second layer is formed (step C).

An optical fiber manufacturing apparatus related to a second aspect of the present invention includes: a drawing section which forms a bare optical fiber by drawing an optical fiber preform; an application section which forms an intermediate optical fiber by providing a coating layer, which is formed of resin, on an outer periphery of the bare optical fiber; a primary curing section which performs primary curing of the coating layer which forms the intermediate optical fiber; a pressing section which presses an outer periphery of the intermediate optical fiber; and a secondary curing section which performs secondary curing of the pressed coating layer of the intermediate optical fiber.

In the optical fiber manufacturing apparatus related to the second aspect of the present invention, the pressing section may include a spinning section which spins the intermediate optical fiber by making at least a pair of spinning rollers perform translational movement or rocking movement in a state where the pair of spinning rollers are in contact with part of the outer periphery of the intermediate optical fiber through the primary-cured coating layer.

In the optical fiber manufacturing apparatus related to the second aspect of the present invention, the pressing section may include a drawing section which grips and draws the intermediate optical fiber using a capstan wheel and a capstan belt.

In the optical fiber manufacturing apparatus related to the second aspect of the present invention, the pressing section may include: a spinning section which spins the intermediate optical fiber by making at least a pair of spinning rollers perform translational movement or rocking movement in a state where the pair of spinning rollers are in contact with part of the outer periphery of the intermediate optical fiber through the primary-cured coating layer; and a drawing section which grips and draws the intermediate optical fiber using a capstan wheel and a capstan belt.

In the optical fiber manufacturing method related to the first aspect of the present invention, the intermediate optical fiber is formed by performing primary curing of the coating layer, which is provided on the outer periphery of the bare optical fiber and is formed of resin, and the outer periphery of the intermediate optical fiber is pressed through the primary-cured coating layer.

In addition, the optical fiber is formed by performing secondary curing of the coating layer of the pressed intermediate optical fiber.

Accordingly, since deformation of the coating layer that occurs due to pressing the coating layer after primary curing or peeling of the coating layer and the glass surface or cracking of the primary coating layer after primary curing is repaired at the time of secondary curing, a satisfactory optical fiber is obtained.

As a result, in the optical fiber manufacturing method related to the first aspect of the present invention, it is possible to prevent deformation or peeling of the coating layer without reducing the drawing speed, and an optical fiber with a high level of reliability can be efficiently manufactured.

The optical fiber manufacturing apparatus related to the second aspect of the present invention includes: the primary curing section which performs primary curing of a coating material to form an intermediate optical fiber with a coating layer; a pressing section which presses the outer periphery of the intermediate optical fiber through the coating layer; and a secondary curing section which performs secondary curing of the coating layer after pressing the intermediate optical fiber to form an optical fiber.

Accordingly, since deformation of the coating layer, peeling of the coating layer and the glass surface, or cracking of the coating layer occurring due to pressing the coating layer after primary curing is repaired at the time of secondary curing, a satisfactory optical fiber is obtained.

As a result, in the optical fiber manufacturing apparatus related to the second aspect of the present invention, it is possible to prevent deformation or peeling of the coating layer without complicating the apparatus or reducing the drawing speed, and an optical fiber with a high level of reliability can be efficiently manufactured.

DETAILED DESCRIPTION OF THE PREFERRED EMBODIMENTS

Hereinafter, a method and apparatus for manufacturing an optical fiber related to an embodiment of the present invention will be described with reference to the drawings.

Figure 1:
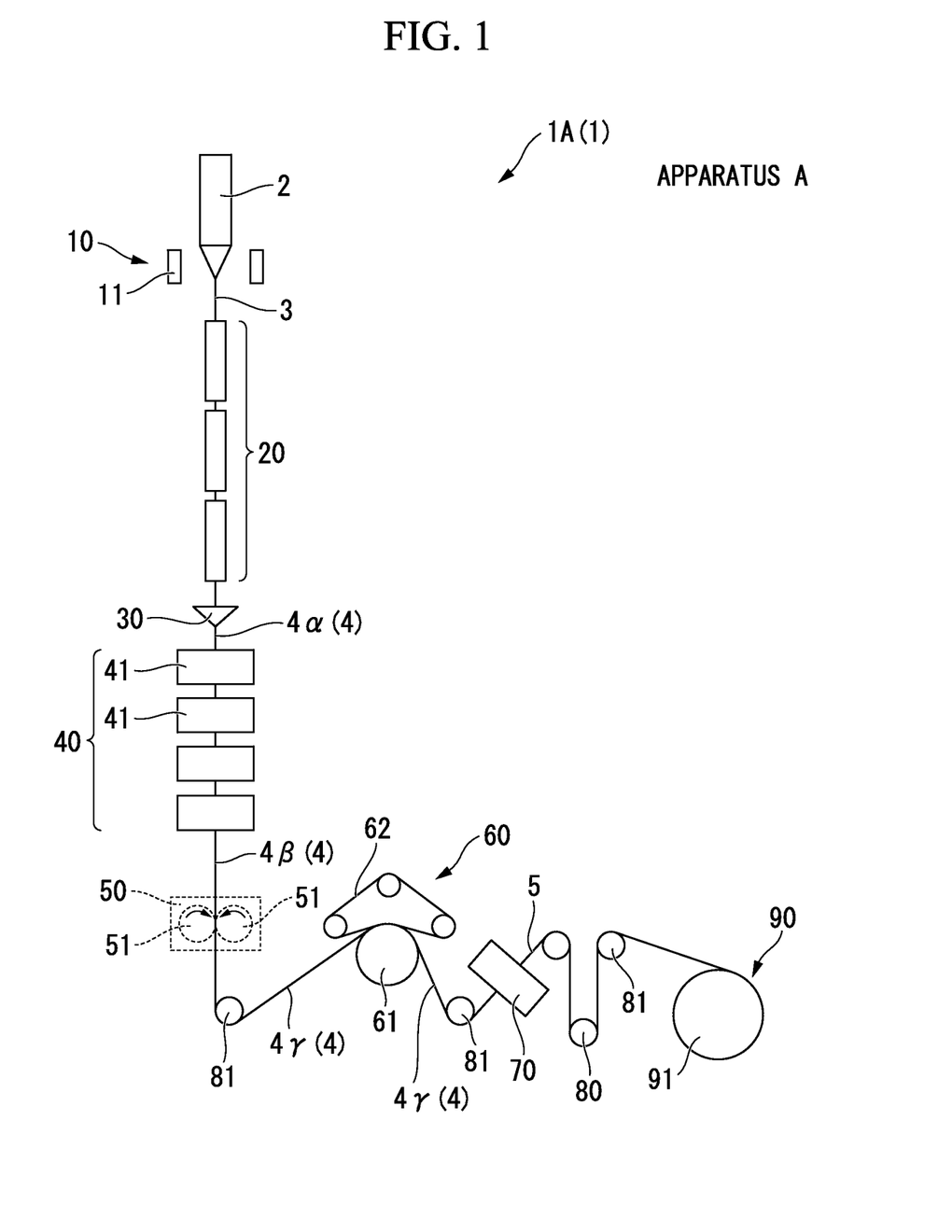
FIG. 1 is a schematic view showing the schematic configuration of an optical fiber manufacturing apparatus related to an embodiment of the present invention.

FIG. 1 is a schematic view showing the schematic configuration of an optical fiber manufacturing apparatus 1A (1) related to an embodiment of the present invention.

An apparatus 1 for manufacturing an optical fiber 5 related to the present embodiment includes at least: a drawing section 10 which draws an optical fiber preform 2 to form a bare optical fiber 3; an application section 30 which applies a coating material on the outer periphery of the bare optical fiber 3 to form an intermediate optical fiber 4α (4); a primary curing section 40 which performs primary curing of the coating material of the intermediate optical fiber 4α (4) to form an intermediate optical fiber 4β (4) with a coating layer; a pressing section which presses the outer periphery of the intermediate optical fiber 4β (4) through the coating layer to form an intermediate optical fiber 4γ; and a secondary curing section 70 which performs secondary curing of the coating layer of the intermediate optical fiber 4γ (4) to form the optical fiber 5.

Accordingly, deformation of the coating layer, peeling the coating layer from the glass surface, or cracking of the coating layer occurring due to pressing the coating layer after primary curing is repaired at the time of secondary curing, therefore a satisfactory optical fiber is obtained.

As a result, in the apparatus 1 for manufacturing the optical fiber 4 of the present embodiment, it is possible to prevent deformation or peeling of the coating layer without complicating the apparatus or reducing the drawing speed, and an optical fiber with a high level of reliability can be efficiently manufactured.

The drawing section 10 includes a heating furnace 11 for drawing the optical fiber preform 2 to form the bare optical fiber 3.

The drawing section 10 heats and melts the tip of a silica glass rod, which is referred to as the optical fiber preform 2 hung in the drawing furnace, using the heating furnace 11 while lowering the silica glass rod, and draws this to manufacture an optical fiber.

The bare optical fiber 3 drawn out of the drawing furnace is cooled by a cooling section 20.

The application section 30 applies a coating material on the outer periphery of the bare optical fiber 3 to form the intermediate optical fiber 4α (4)).

The cooled optical fiber is coated with resin by the application section 30 in order to protect the bare optical fiber 3.

Generally, resin coating is a two-layer coating, and a material for a primary coating layer with a low Young's modulus is applied inside and a material for a secondary coating layer with a high Young's-modulus is applied outside.

The material used as the primary coating layer and the secondary coating layer is ultraviolet curable resin in many cases, and this ultraviolet curable resin is cured by a UV lamp.

Moreover, as the coating method, there are methods such as a method of applying the primary coating layer and the secondary coating layer separately and curing each of them and a method of applying the primary coating layer and the secondary coating layer simultaneously and curing them collectively.

Although the case where the primary coating layer and the secondary coating layer are applied simultaneously is mentioned in the example shown in FIG. 1, the present invention is not limited to this configuration.

The primary curing section 40 includes a UV lamp 41. The UV lamp 41 performs primary curing of the coating material of the intermediate optical fiber 4α (4) to form the intermediate optical fiber 4β (4).

As the primary curing section 40, for example, four pairs of UV lamps are arrayed along the longitudinal direction such that the intermediate optical fiber 4α (4) is interposed therebetween.

The pressing section presses the outer periphery of the intermediate optical fiber 4β (4) through the coating layer to form the intermediate optical fiber 4γ (4).

Here, the pressing section includes a spinning section 50 which spins the intermediate optical fiber 4β (4) by making at least a pair of spinning rollers perform translational movement or rocking movement in a state where the pair of spinning rollers are in contact with part of the outer periphery of the intermediate optical fiber 4β (4) through the primary-cured coating layer and/or a drawing section 60 which grips and draws the intermediate optical fiber 4γ (4) using a capstan wheel and a capstan belt.

Generally, the spinning section 50 is used to reduce polarization mode dispersion (PMD) which is a characteristic of the optical fiber. However, the spinning section 50 may not be particularly needed when implementing measures other than a spin for PMD reduction (for example, when reducing the non-circularity of the optical fiber preform 2).

In addition, when the drawing section 60 is formed by only the capstan wheel 61, the drawing section 60 is not included in the pressing section since the intermediate optical fiber 4β (4) is not pressed.

A device which has at least a pair of spinning rollers 51 in contact with part of the outer periphery of the intermediate optical fiber 4β (4) being drawn and which has a mechanism in which the pair of spinning rollers 51 perform translational movement or a device having a mechanism in which a pair of spinning rollers 51 perform rocking movement is used as the spinning section 50.

Examples of the spinning section 50 having a mechanism in which a pair of spinning rollers perform translational movement include a device in which the intermediate optical fiber 4β (4) is made to roll in a direction, which is approximately perpendicular to the drawing direction, between circumferential curved surfaces of the pair of spinning rollers 51 by reversing the movement direction of the pair of spinning rollers 51 periodically while pressing the intermediate optical fiber 4β (4) between the circumferential curved surfaces of the pair of rotating spinning rollers 51, so that a spin is periodically applied to the intermediate optical fiber 4β (4) with the drawing direction as its axis to apply a torque.

Specifically, the spinning section 50 is schematically configured to include at least the pair of spinning rollers 51, which are in contact with part of the outer periphery of the intermediate optical fiber 4β (4) being drawn, and a support section (not shown) which supports them.

The spinning rollers 51 are disposed such that the intermediate optical fiber 4β (4) is interposed therebetween, and are also disposed such that the longitudinal direction is approximately perpendicular to the drawing direction of the optical fiber 4.

In addition, the spinning roller 51 is rotatable with a central shaft, which is formed integrally with the spinning roller 51, as its center.

In addition, the spinning roller 51 can perform translational movement in a direction, which is perpendicular to the drawing direction of the optical fiber 4, together with the central shaft.

The spinning rollers 51 perform translational movement periodically in a direction, which is perpendicular to the drawing direction of the optical fiber 4, in a state in which they are in contact with part of the outer periphery of the intermediate optical fiber 4β (4) being drawn while rotating in the arrow direction in the drawing with the central axis as its center, thereby applying a torque.

The intermediate optical fiber 4β (4) being drawn is spun by the torque applied to the intermediate optical fiber 4β (4) and friction between the surfaces of the spinning rollers 51 and the coating layer (outer periphery) of the intermediate optical fiber 4β (4).

As a result, the spun intermediate optical fiber 4γ (4) is obtained.

In addition to the spinning section 50 described above, examples of the spinning section 50 having a mechanism in which the pair of spinning rollers 51 perform translational movement include a device in which the pair of spinning rollers 51 are periodically tilted in different directions and obliquely with respect to the drawing direction while pressing the intermediate optical fiber 4β (4) between the circumferential curved surfaces of the pair of rotating spinning rollers 51, so that a spin is periodically applied to the intermediate optical fiber 4β (4) with the longitudinal direction as its axis to apply a torque.

In addition, as another example of the spinning section 50 having a mechanism in which spinning rollers perform translational movement, a device may be mentioned in which the intermediate optical fiber 4β (4) periodically rocks (performs rocking movement) in a direction, which is parallel to the drawing direction, in a state where the rotating spinning rollers 51 and the intermediate optical fiber 4β (4) are in contact with each other, so that a spin is periodically applied to the intermediate optical fiber 4β (4) with the longitudinal direction as its axis to apply a torque.

The direction of the intermediate optical fiber 4γ (4), on which the coating layer is formed and which is spun by the spinning section 50 that is a pressing section, can be changed by a pulley 81, and the intermediate optical fiber 4γ (4) is drawn by the drawing section 60 including the capstan wheel 61 and a capstan belt 62, which is another pressing section.

In the drawing section 60, the drawing capstan 61 rotates at high speed, and the drawing speed is determined at this process.

The drawing capstan 61 rotates at a speed equivalent to, for example, 2000 m/min or 1500 m/min of the drawing speed.

As the drawing section 60, it is possible to adopt a drawing capstan for pressing the intermediate optical fiber 4γ (4) against the capstan belt, which is disclosed in Japanese Unexamined Patent Application, First Publication No. H9-227171.

In addition, the pulley 81 or the like which is only to change the movement direction without pressing the intermediate optical fiber 4β (4) does not interpose the intermediate optical fiber 4β (4) therebetween. Accordingly, since damage to the coating layer of the intermediate optical fiber 4β (4) is very small and deformation, peeling, or cracking of the coating layer does not occur, the pulley 81 is not included in the pressing section in the present embodiment.

The secondary curing section 70 includes UV lamp which performs secondary curing of the coating layer of the intermediate optical fiber 4γ (4), which has been further pressed by the drawing section 60, to form the optical fiber 5.

Deformation of the coating layer, peeling of the coating layer and the glass surface, or cracking of the coating layer occurring due to pressing the coating layer after primary curing is repaired at the time of secondary curing.

This is because at the time of secondary curing, peeling or cracking occurring at the time of primary curing is repaired by the synergistic effect of "curing reaction proceeding further and the network of molecules extending" and "temperature of the coating material rising locally as a result of the exothermic reaction in curing and becoming greater than or equal to the glass transition temperature".

Finally, a winding section 90 winds the optical fiber 5 drawn at high speed on a winding drum 91.

In this path, a device (dancer pulley 80) which absorbs and corrects rotation speed difference between the drawing speed and the winding speed is generally disposed.

This method may be applied to the spinning section 50 only using line arrangement. Alternatively, for an apparatus which does not use the spinning section 50, this method may be applied to the drawing section 60 only or may be applied to both the spinning section 50 and the drawing section 60.

It is more desirable to apply this method to both the spinning section 50 and the drawing section 60.

Moreover, in the above embodiment, a case where the primary coating layer and the secondary coating layer are simultaneously applied and are collectively cured has been described as an example for the application section 30. However, the present invention is not limited to this, and it is also possible to apply the primary coating layer and the secondary coating layer separately and cure them separately.

Figure 2:
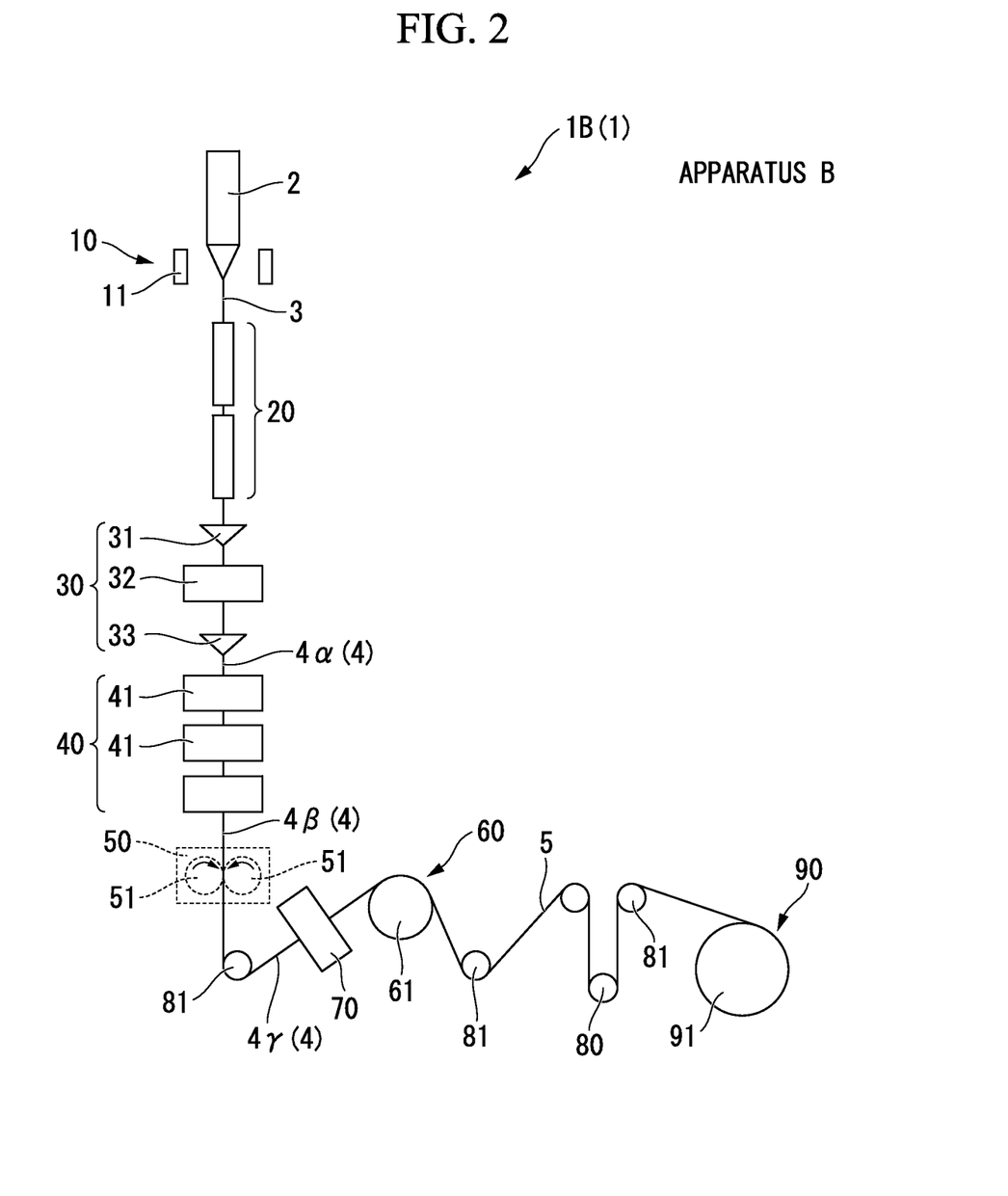
FIG. 2 is a schematic view showing the schematic configuration of the optical fiber manufacturing apparatus related to the same embodiment.

For example, a manufacturing apparatus 1B (1) shown in FIG. 2 separately includes a coating section 31 for applying a primary coating layer and a coating section 33 for applying a secondary coating layer.

In this case, a curing section 32 for a primary coating layer including a UV lamp for curing a primary coating layer is disposed between the coating section 31 for applying a primary coating layer and the coating section 33 for applying a secondary coating layer.

Moreover, in the above embodiment, a case where the primary curing section 40 of the intermediate optical fiber 4α (4) includes four pairs of UV lamps 41 arrayed along the longitudinal direction has been described as an example. However, the present invention is not limited only to this, and the number of UV lamps may be appropriately changed.

For example, the manufacturing apparatus 1B (1) shown in FIG. 2 includes three UV lamps arrayed along the longitudinal direction.

Moreover, in the above embodiment, a case where the pressing section includes both the spinning section 50 and the drawing section 60 has been described as an example. However, the present invention is not limited to this, and the pressing section may include either the spinning section 50 or the drawing section 60.

For example, in the manufacturing apparatus 1B shown in FIG. 2, the pressing section may include only the spinning section 50.

Figure 3:
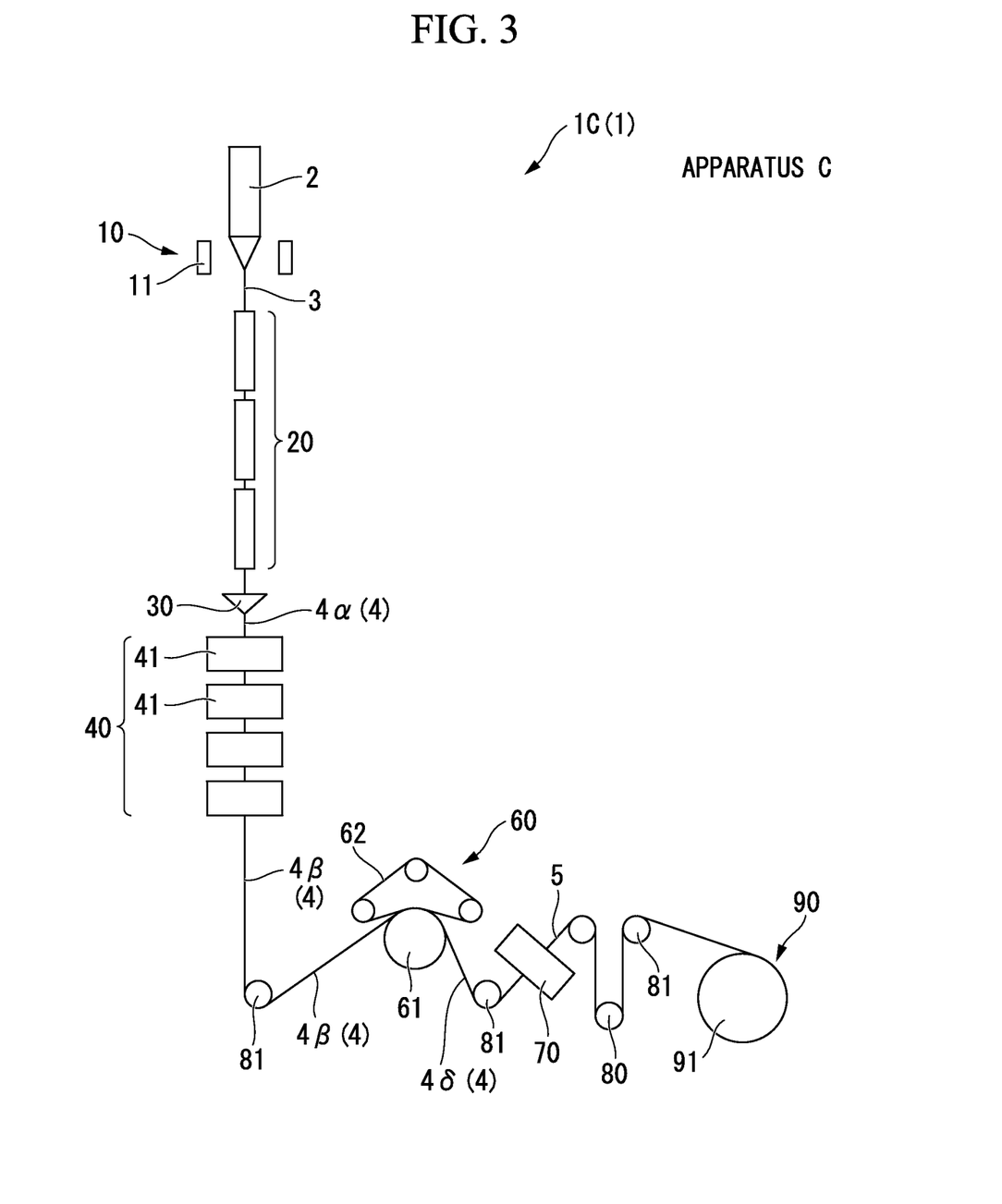
FIG. 3 is a schematic view showing the schematic configuration of the optical fiber manufacturing apparatus related to the same embodiment.

In a manufacturing apparatus 1C (1) shown in FIG. 3, the pressing section may include only the drawing section.

Next, an optical fiber manufacturing method using such a manufacturing apparatus 1A (1) will be described.

An optical fiber manufacturing method of the present embodiment includes at least: step A of drawing the optical fiber preform 2 to form the bare optical fiber 3; step B of applying a coating material on the outer periphery of the bare optical fiber 3 to form the intermediate optical fiber 4α (4); step C of performing primary curing of the coating material of the intermediate optical fiber 4α (4) to form the intermediate optical fiber 4β (4) with a coating layer; step D of pressing the outer periphery of the intermediate optical fiber 4β (4) through the coating layer to form the intermediate optical fiber 4γ; and step E of performing secondary curing of the coating layer of the intermediate optical fiber 4γ (4) to form the optical fiber 5.

Accordingly, since deformation of the coating layer, peeling of the coating layer and the glass surface, or cracking of the coating layer occurring due to pressing the coating layer after primary curing is repaired at the time of secondary curing, a satisfactory optical fiber is obtained.

As a result, in the optical fiber manufacturing method of the present embodiment, it is possible to prevent deformation or peeling of the coating layer without reducing the drawing speed, and an optical fiber 5 with a high level of reliability can be efficiently manufactured.

Hereinafter, the process will be described in order.

(1) The optical fiber preform 2 is drawn to form the bare optical fiber 3 (step A).

First, the optical fiber preform 2 having silica-based glass as a main component is hung within the heating furnace 11 of the drawing section 10 so as to be movable in the axial direction, the lower end is heated at a temperature of 2000° C. in an inert gas atmosphere of argon (Ar), helium (He), and the like, and then the optical fiber is drawn to form the bare optical fiber 3 (drawing).

In addition, as a method of manufacturing the optical fiber preform 2, there are a vapor-phase axial deposition method (VAD method), an outside vapor deposition method (OVD method), an inside vapor deposition method (CVD method, MCVD method, and PCVD method), a rod-in-tube method, and the like. The present invention is not limited only to these methods.

Then, the drawn bare optical fiber 3 is fed into the cooling section 20.

A cooling gas, such as helium or nitrogen gas, is supplied to the cooling section 20. In the cooling section 20, the bare optical fiber 3 is quenched to a temperature suitable for application of a coating material in the next step.

The coating material is applied on the outer periphery of the bare optical fiber 3 to form the intermediate optical fiber 4α (4) (step B).

A coating material of ultraviolet curable resin is applied to (coated on) the bare optical fiber 3 cooled in the cooling section 20, so as to cover the outer periphery, by the application section 30 for coating layer formation.

Generally, resin coating is a two-layer coating, and a primary material with a low Young's modulus is applied inside and a secondary material with a high Young's-modulus is applied outside.

In other words, the coating layer which is two-layer-coated includes a first layer disposed in contact with the bare optical fiber 3 and a second layer disposed so as to overlap the first layer.

As a resin which forms the second layer, a resin with a high Young's modulus compared with the resin which forms the first layer is used.

As the application method, there are methods such as a method of applying a first layer (primary coating layer) and a second layer (secondary coating layer) separately and curing each of them and a method of applying the first layer (primary coating layer) and the second layer (secondary coating layer) simultaneously and curing them collectively. The present invention is not limited only to these methods.

As a result, the intermediate optical fiber 4α (4), in which the coating layer including the first layer (primary coating layer) and the second layer (secondary coating layer) is formed on the outer periphery of the bare optical fiber 3, is obtained.

(3) Primary curing of the coating material of the intermediate optical fiber 4α (4) is performed to form the intermediate optical fiber 4β (4) (step C).

Then, the optical fiber 4α (4) on which the coating layer is formed is fed to the primary curing section 40, and the optical fiber 4α (4) is cured (temporary curing) by ultraviolet rays emitted from the UV lamp 41 provided in the primary curing section 40 to thereby form a primary-cured coating layer.

As a result, the intermediate optical fiber 4β (4) including the primary-cured coating layer is obtained.

As the degree of curing of the coating layer formed by primary curing, a gel fraction which is an evaluation method for evaluating the degree of curing of a general coating material is preferably 70% to 90%.

When the degree of curing is lower than 70%, curing is not sufficient. Accordingly, there is a possibility that an unreacted coating material will adhere to the pressing section (the spinning section 50 and the drawing section 60) in subsequent steps, or there is a possibility that the number of times of spinning will be reduced since the spin torque of the spinning section 50 is not easily transmitted to the bare optical fiber 3.

On the other hand, when the degree of curing is higher than 90%, the amount of unreacted coating material is small. Accordingly, a sufficient repair effect when repairing the deformation, peeling, and cracking, which occur in the primary coating layer in the pressing step, by secondary curing is not obtained.

The outer periphery of the intermediate optical fiber 4β (4) is pressed through the primary-cured coating layer to form the intermediate optical fiber 4γ (4) (step D).

Step D is a spinning step of spinning the intermediate optical fiber 4β (4) and/or a drawing step of gripping and drawing the intermediate optical fiber 4β (4).

In the case of the spinning step, at least a pair of spinning rollers 51 perform translational movement or rocking movement in a state where the pair of spinning rollers 51 are in contact with part of the outer periphery of the intermediate optical fiber 4β (4) through the primary-cured coating layer, so that the intermediate optical fiber 4β (4) is spun.

Specifically, for example, the intermediate optical fiber 4β (4) is made to roll in a direction, which is approximately perpendicular to the drawing direction, between circumferential curved surfaces of the pair of spinning rollers 51 by reversing the movement direction of the pair of spinning rollers 51 periodically while pressing the intermediate optical fiber 4β (4) between the circumferential curved surfaces of the pair of rotating spinning rollers 51, so that a spin is periodically applied to the intermediate optical fiber 4β (4) with the drawing direction as its axis to apply a torque.

The intermediate optical fiber 4β (4) being drawn is spun by the torque applied to the intermediate optical fiber 4β (4) and friction between the surfaces of the spinning rollers 51 and the coating layer (outer periphery) of the intermediate optical fiber 4β (4).

Then, in the case of the drawing step, the intermediate optical fiber 4γ (4) after the above spinning step is gripped and drawn using the capstan wheel 61 and the capstan belt 62.

Then, the intermediate body delivered through the drawing step is the intermediate optical fiber 4γ (4).

(5) Secondary curing of the coating layer of the drawn intermediate optical fiber 4γ (4) is performed to form the optical fiber 5 (step E).

Then, the intermediate optical fiber 4γ (4) is fed to the secondary curing section 70, and the coating layer is further cured (secondary curing) by ultraviolet rays emitted from the secondary curing section 70 (UV lamp) to thereby form the optical fiber 5.

Deformation of the coating layer, peeling of the coating layer and the glass surface, or cracking of the coating layer occurring due to pressing the coating layer after primary curing is repaired in the secondary curing.

This is because at the time of secondary curing, peeling or cracking occurring in the coating layer at the time of primary curing is repaired by synergistic effect of "curing reaction of the coating material proceeding further and the network of molecules extending" and "temperature of the coating material rising locally as a result of the exothermic reaction in curing and becoming greater than or equal to the glass transition temperature".

As the degree of curing of the secondary-cured coating layer, the gel fraction is preferably 85% or higher.

When the degree of curing is lower than 85%, uncured components remain in the coating layer. Then, in subsequent steps, for example, in a coloring step or in a taping step, the uncured components react to become volatile components. As a result, peeling of the coating layer, the colored layer, and the taping layer at the time of drawing occur easily, or defects, such as a bump, which is a minute outside diameter change, occur easily.

By setting the gel fraction to be greater than or equal to 85%, such a problem can be avoided.

Finally, the direction of the optical fiber 5 is changed to another direction by the pulley 81, and the optical fiber 5 is wound on the winding drum 91 of the winding section 90 through the dancer pulley 80.

As described above, in the present embodiment, curing of the coating layer is performed in two separate steps before and after the pressing step. Therefore, since deformation of the coating layer, peeling of the coating layer and the glass surface, or cracking of the coating layer occurring due to pressing the coating layer after primary curing is repaired at the time of secondary curing, a satisfactory optical fiber is obtained.

Thus, in the present embodiment, it is possible to prevent deformation or peeling of the coating layer without complicating the apparatus or reducing the drawing speed. As a result, an optical fiber 5 with a high level of reliability can be efficiently manufactured.

Here in before, the method and apparatus for manufacturing an optical fiber of the present embodiment has been described. However, the present invention is not limited only to the above example, and may be appropriately changed without deviating from the scope of the invention.

EXAMPLES

An optical fiber was manufactured using the manufacturing apparatus with the configuration described above.

First Experimental Example

An optical fiber was manufactured using the manufacturing apparatus 1A (apparatus A) shown in FIG. 1.

Drawing was performed at a drawing speed of 2500 m/min using an optical fiber preform with an external diameter φ of 150 mm.

For coating a coating layer, a method was used in which a first layer (primary coating layer) and a second layer (secondary coating layer) were simultaneously coated and cured.

Primary curing of the coating layer was performed by a primary curing section having a UV lamp, and then a spinning step and a drawing step using a capstan belt were performed.

Then, secondary curing of the coating layer was performed by a secondary curing section having a UV lamp.

Then, 500-km drawing was performed while winding the optical fiber on the winding bobbin through the dancer pulley.

Second Experimental Example

An optical fiber was manufactured using the manufacturing apparatus 1A (apparatus A) shown in FIG. 1.

The optical fiber was manufactured in the same manner as in the first experimental example except that UV lamp outputs of the primary curing section and the secondary curing section were adjusted so that the gel fraction after primary curing of the coating layer was 70% (another sample was manufactured and evaluated) and the gel fraction after secondary curing was 80%.

Third Experimental Example

An optical fiber was manufactured using a manufacturing apparatus 1B (apparatus B) shown in FIG. 2.

Drawing was performed at a drawing speed of 1500 m/min using an optical fiber preform with an external diameter φ of 150 mm.

For coating of a coating layer, a method was used in which a first layer (primary coating layer) and a second layer (secondary coating layer) were separately coated and cured.

Primary curing of the coating layer was performed by a primary curing section having a UV lamp, and then a spinning step was performed.

Then, secondary curing of the coating layer was performed by a secondary curing section having a UV lamp.

Then, 500-km drawing was performed while winding the optical fiber on a winding bobbin through a drawing capstan (without using a belt).

Fourth Experimental Example

An optical fiber was manufactured using the manufacturing apparatus 1B (apparatus B) shown in FIG. 2.

The optical fiber was manufactured in the same manner as in the third experimental example except that the drawing speed of the optical fiber preform was set to 2000 m/min.

Fifth Experimental Example

An optical fiber was manufactured using the manufacturing apparatus 1B (apparatus B) shown in FIG. 2.

The optical fiber was manufactured in the same manner as in the fourth experimental example except that UV lamp outputs of the primary curing section and the secondary curing section were adjusted so that the gel fraction after primary curing of the coating layer was 60% (another sample was manufactured and evaluated) and the gel fraction after secondary curing was 85%.

Sixth Experimental Example

An optical fiber was manufactured using a manufacturing apparatus 1C (apparatus C) shown in FIG. 3.

Drawing was performed at a drawing speed of 2000 m/min using an optical fiber preform with an external diameter $\phi$ of 150 mm.

For coating of a coating layer, a method was used in which a first layer (primary coating layer) and a second layer (secondary coating layer) were simultaneously coated and cured.

Primary curing of the coating layer was performed by a primary curing section having a UV lamp, and then a drawing step using a capstan belt was performed.

Then, secondary curing of the coating layer was performed by a secondary curing section having a UV lamp.

Then, 500-km drawing was performed while winding the optical fiber on a winding bobbin through a dancer pulley.

Seventh Experimental Example

An optical fiber was manufactured using the manufacturing apparatus 1C (apparatus C) shown in FIG. 3.

The optical fiber was manufactured in the same manner as in the sixth experimental example except that UV lamp outputs of the primary curing section and the secondary curing section were adjusted so that the gel fraction after primary curing of the coating layer was 92% (another sample was manufactured and evaluated) and the gel fraction after secondary curing was 95%.

Eighth Experimental Example

Figure 4:
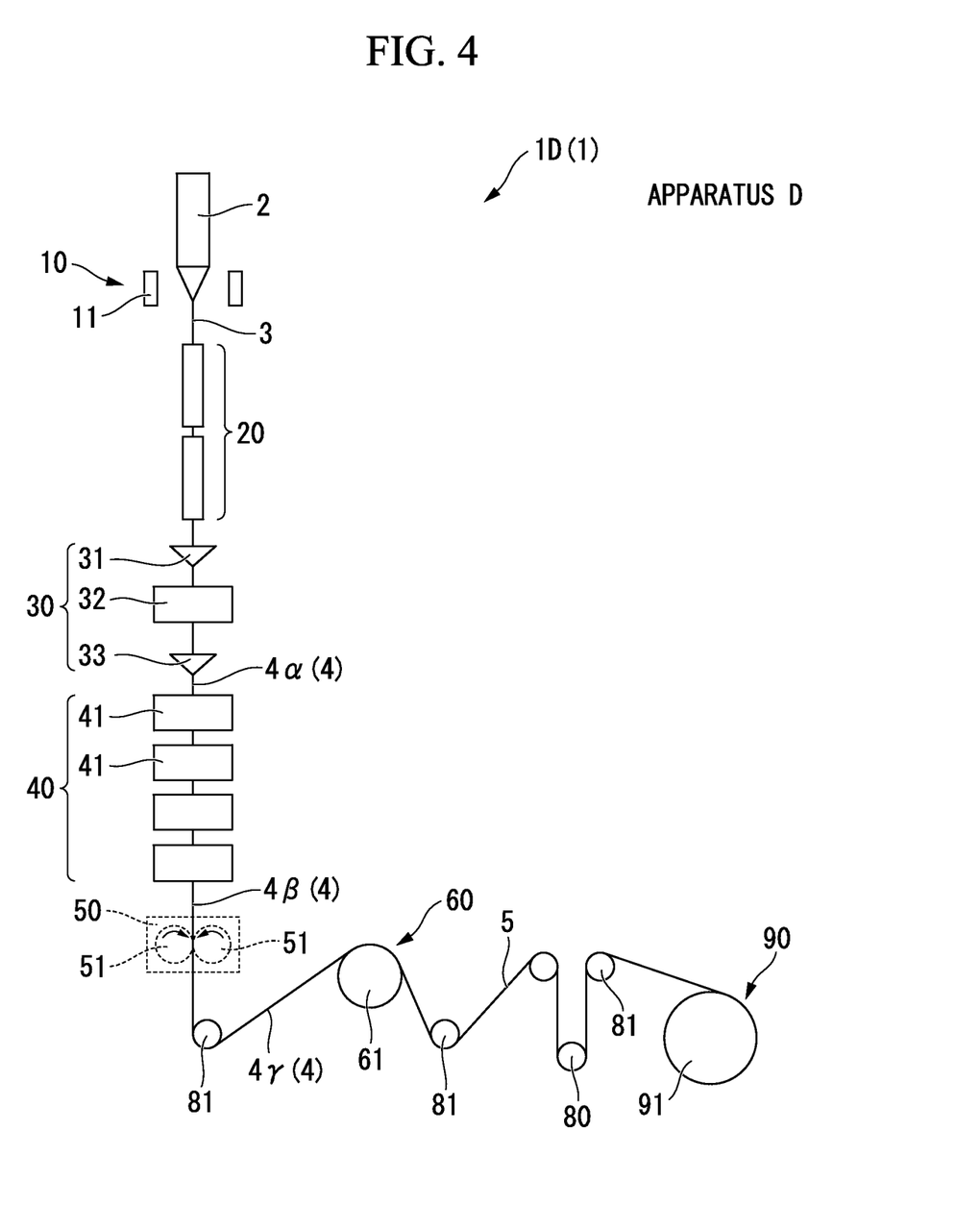
FIG. 4 is a schematic view showing the schematic configuration of an optical fiber manufacturing apparatus used in an experimental example.

An optical fiber was manufactured using a manufacturing apparatus 1D (apparatus D) shown in FIG. 4.

Drawing was performed at a drawing speed of 1500 m/min using an optical fiber preform with an external diameter $\phi$ of 150 mm.

For coating of a coating layer, a method was used in which a first layer (primary coating layer) and a second layer (secondary coating layer) were separately coated and cured.

The coating layer was cured by a curing section having a UV lamp, and then a spinning step was performed.

Then, 500-km drawing was performed while winding the optical fiber on a winding bobbin through a drawing capstan (without a belt).

Ninth Experimental Example

An optical fiber was manufactured using the manufacturing apparatus 1D (apparatus D) shown in FIG. 4.

In the manufacturing apparatus D, the optical fiber was manufactured in the same manner as in the eighth example except that an additional UV lamp provided in the curing section.

Tenth Experimental Example

Figure 5:
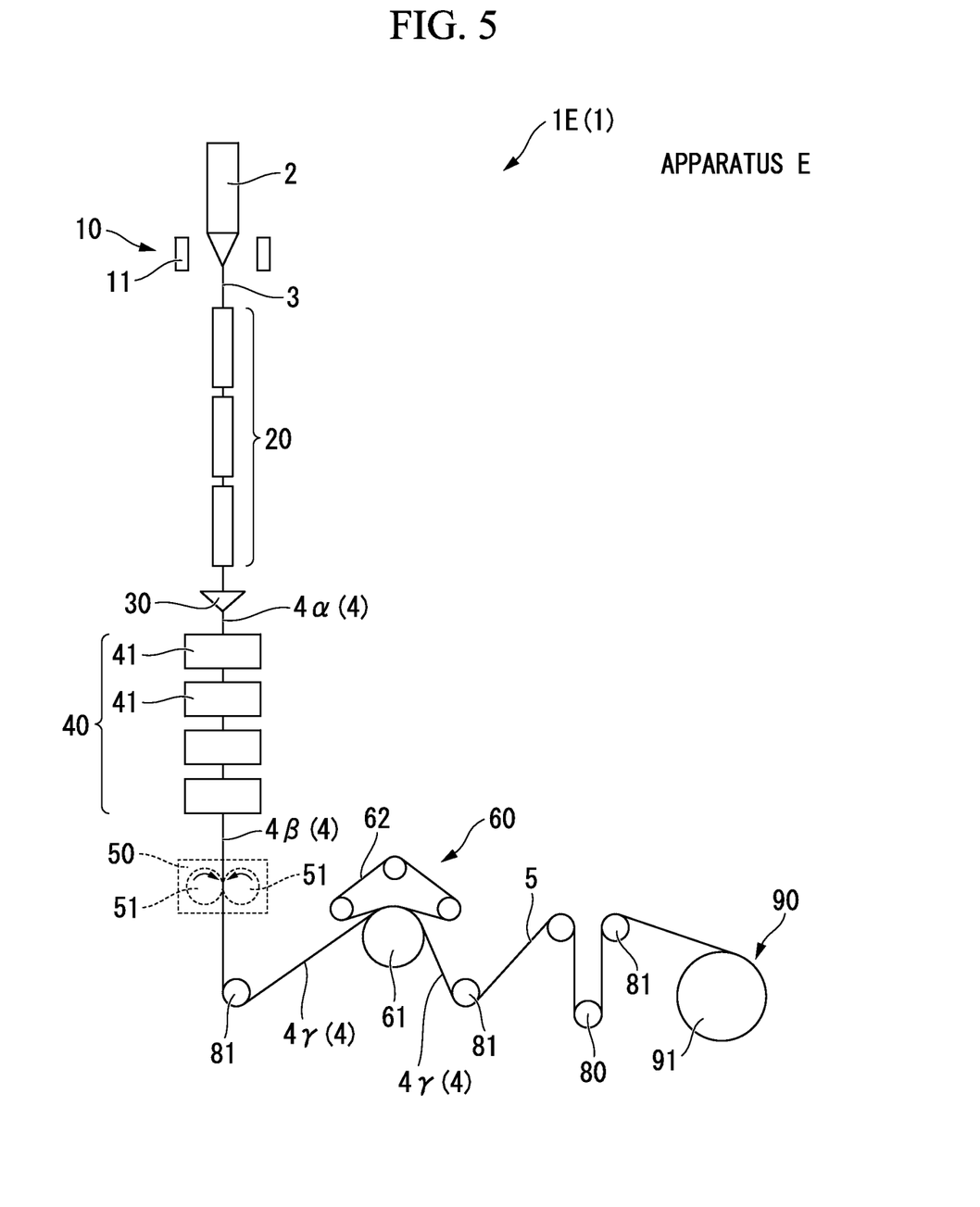
FIG. 5 is a schematic view showing the schematic configuration of an optical fiber manufacturing apparatus used in an experimental example.

An optical fiber was manufactured using a manufacturing apparatus 1E (apparatus E) shown in FIG. 5.

Drawing was performed at a drawing speed of 2000 m/min using an optical fiber preform with an external diameter $\phi$ of 150 mm.

For coating of a coating layer, a method was used in which a first layer (primary coating layer) and a second layer (secondary coating layer) were simultaneously coated and cured.

The coating layer was cured by a curing section having a UV lamp, and then a spinning step and a drawing step using a capstan belt were performed.

Then, 500-km drawing was performed while winding the optical fiber on a winding bobbin through a dancer pulley.

Eleventh Experimental Example

Figure 6:
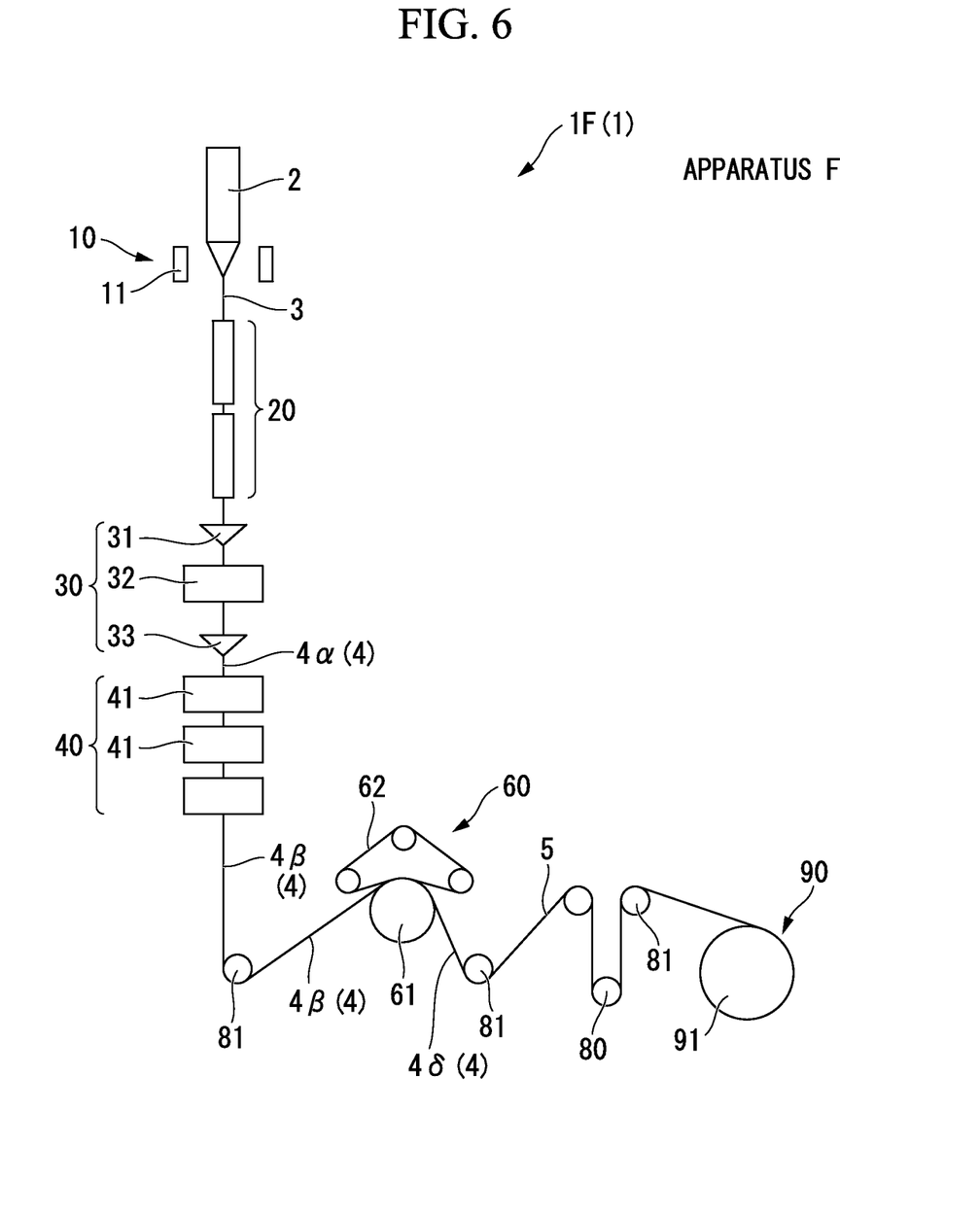
FIG. 6 is a schematic view showing the schematic configuration of an optical fiber manufacturing apparatus used in an experimental example.

An optical fiber was manufactured using a manufacturing apparatus 1F (apparatus F) shown in FIG. 6.

Drawing was performed at a drawing speed of 2500 m/min using an optical fiber preform with an external diameter $\phi$ of 150 mm.

For coating a coating layer, a method was used in which a first layer (primary coating layer) and a second layer (secondary coating layer) were separately coated and cured.

Primary curing of the coating layer was performed by a primary curing section having a UV lamp, and then a drawing step using a capstan belt was performed.

Then, 500-km drawing was performed while winding the optical fiber on a winding bobbin through a dancer pulley.

The optical fiber after drawing in the first to eleventh experimental examples manufactured as described above was cut every 50 km, samples were taken from the cut fiber, and evaluation regarding the gel fraction, the average value of coating deformation, and a loss change at $-60°$ C. was performed.

For measurement of the gel fraction of a coating layer, the coating layer is immersed in a $60°$ C. methyl ethyl ketone (MEK) solvent for 16 hours for so-called solvent-extraction of uncured components, is taken out, and then a sample coating weight (W) is measured.

Assuming that the initial weight of a sample is $W_0$, the gel fraction is expressed as "$(W/W_0) \times 100(\%)$".

The average value of coat deformation was measured using PK2401 provided by Photon Kinetics, Inc.

For a loss change at $-60°$ C., a 1000-m fiber was put into the constant temperature bath in a free coil state and the loss change at $-60°$ C. was compared with that at room temperature as a reference.

If there is damage, such as deformation, peeling, and cracking of the coating material, the loss becomes a microbend loss. That is, the loss increases.

In addition, peeling and cracking of the coating layer were observed using a microscope.

Evaluation results regarding the optical fiber in the first to eleventh examples are shown in Table 1.

TABLE 1

| | Drawing device | Drawing speed (m/min) | Primary curing | Gel Fraction after primary curing (%) | Pressing method | Secondary curing | Gel Fraction after secondary curing (%) | Average value of coating layer deformation (%) | Loss at low temperature | peeling | Crack |
|---|---|---|---|---|---|---|---|---|---|---|---|
| First experimental example | A | 2500 | Yes | 70 | spin + drawing | Yes | 85 | 2% or less | reduced | None | |
| Second experimental example | A | 2500 | Yes | 70 | spin + drawing | Yes | 80 | 2% or less | reduced | None | None |
| Third experimental example | B | 1500 | Yes | 90 | spin | Yes | 95 | 2% or less | reduced | None | None |
| Fourth experimental example | B | 2000 | Yes | 80 | spin | Yes | 90 | 2% or less | reduced | None | None |
| Fifth experimental example | B | 2000 | Yes | 60 | spin | Yes | 85 | 2% or less | reduced | None | None |
| Sixth experimental example | C | 2000 | Yes | 80 | Drawing | Yes | 90 | 2% or less | reduced | None | None |
| Seventh experimental example | C | 2000 | Yes | 92 | Drawing | Yes | 95 | 3% or more | No change | None | None |
| Eighth experimental example | D | 1500 | Yes | 90 | (spin) | None | — | 3% or more | Increased | Yes | Yes |
| Ninth experimental example | D | 1500 | Yes | 95 | (spin) | None | — | 3% or more | Increased | Yes | Yes |
| Tenth experimental example | E | 2000 | Yes | 80 | (spin + Drawing) | None | — | 3% or more | Increased | Yes | None |
| Eleventh experimental example | F | 2500 | Yes | 70 | (Drawing) | None | — | 3% or more | Increased | Yes | Yes |

The first to seventh experimental examples are examples in which secondary curing is performed, and the eighth to eleventh experimental examples are examples in which secondary curing is not performed.

In the eighth to eleventh experimental examples, the gel fractions after curing are 90%, 95%, 80%, and 70%, respectively, and these are equivalent to the gel fractions after primary curing in the first to seventh experimental examples.

When the first to seventh experimental examples are compared with the eighth to eleventh experimental examples, a satisfactory optical fiber is obtained without deformation damage, a loss increase at low temperature, peeling, cracking, and the like in the first to seventh experimental examples.

In addition, adhesion of dirt to a pressing device was not observed. In contrast, in the eighth to eleventh experimental examples, coating deformation, a loss increase at low temperature, peeling, cracking, and the like were a problem.

This indicates that a coating material is damaged only by primary curing, but damage to the coating material is repaired by setting secondary curing.

In addition, in the ninth experimental example, with respect to the eighth experimental example, one UV lamp was additionally provided in the curing section.

This is to increase the gel fraction after curing.

As a result, the gel fraction increases from 90% in the eighth experimental example to 95%, but the coating layer is damaged.

Moreover, as a pressing device, a spinning device and a drawing capstan are used in the first and second experimental examples, a spinning device is used in the third to fifth experimental examples, and a drawing capstan is used in the sixth and seventh experimental examples.

All the above cases indicate that damage can be repaired by executing secondary curing even if a coating material is damaged after primary curing.

In each of the cases, the gel fraction after secondary curing is 70 to 90%, while the gel fraction after primary curing is 80 to 95%.

In addition, the fourth and sixth experimental examples had the same conditions except that the pressing device was a spinning device or a drawing capstan (with a belt).

From this result, it can be confirmed that the same effects are obtained in both a case where the pressing device is a spinning device and a case where the pressing device is a drawing capstan.

In the fifth experimental example, the gel fraction after primary curing was 60%.

In this case, since the degree of curing was too low, uncured components or volatile components of the coating material adhered to the pressing device.

However, the repair effect of damage to the coating material is obtained.

On the other hand, in the seventh experimental example, the gel fraction after primary curing was 92%.

In this case, the gel fraction further increases to 95% due to secondary curing, but damage to the coating material caused by pressing remains without being repaired.

In the second experimental example, the gel fraction after secondary curing was 80%.

In this case, the repair effect of damage to the coating material by pressing is obtained. In subsequent steps after drawing, however, problems arose when coloring was performed in the coloring step and taping was performed in the taping step.

From the above results, it was confirmed that, even if damage, such as deformation, peeling, or cracking, occurred in the primary coating layer due to pressing the coating layer after primary curing, the damage was repaired by performing secondary curing and accordingly a satisfactory optical fiber was obtained.

In particular, it was confirmed that a sufficient repair effect was obtained when the gel fraction was 70 to 90% as the degree of curing of the coating layer after primary curing.

In addition, it was confirmed that a problem in subsequent steps could be avoided when the gel fraction was greater than or equal to 85% as the degree of curing of the coating layer after secondary curing.

The present invention can be widely applied to the method and apparatus for manufacturing an optical fiber.

What is claimed is:

1. An optical fiber manufacturing method comprising:
    forming a bare optical fiber by drawing an optical fiber preform;
    forming an intermediate optical fiber by providing a coating layer on an outer periphery of the bare optical fiber, the coating layer being formed of resin, the coating layer including a first layer disposed in contact with the bare optical fiber and a second layer disposed so as to overlap the first layer, the second layer having a higher Young's modulus of resin than the first layer;
    performing primary curing of the coating layer which forms the intermediate optical fiber;
    pressing an outer periphery of the intermediate optical fiber;
    performing secondary curing of the pressed coating layer of the intermediate optical fiber by emitting ultraviolet rays to the pressed coating layer, thereby forming an optical fiber; and
    winding the optical fiber after completing the secondary curing.

2. The optical fiber manufacturing method according to claim 1, wherein,
    when pressing the outer periphery of the intermediate optical fiber, the intermediate optical fiber is spun by making at least a pair of spinning rollers perform translational movement or rocking movement in a state where the pair of spinning rollers are in contact with part of the outer periphery of the intermediate optical fiber through the primary-cured coating layer.

3. The optical fiber manufacturing method according to claim 1, wherein,
    when pressing the outer periphery of the intermediate optical fiber, the intermediate optical fiber is gripped and drawn using a capstan wheel and a capstan belt.

4. The optical fiber manufacturing method according to claim 1, wherein,
    when pressing the outer periphery of the intermediate optical fiber, the intermediate optical fiber is spun by making at least a pair of spinning rollers perform translational movement or rocking movement in a state where the pair of spinning rollers are in contact with part of the outer periphery of the intermediate optical fiber through the primary-cured coating layer, and
    the intermediate optical fiber is gripped and drawn using a capstan wheel and a capstan belt.

5. The optical fiber manufacturing method according to claim 1, wherein,
    when the coating layer is formed in a two-layer structure having the first and second layers, the coating layer is primary-cured after the first layer is formed and also primary-cured after the second layer is formed.

* * * * *